United States Patent
Liu et al.

(10) Patent No.: US 12,077,624 B2
(45) Date of Patent: Sep. 3, 2024

(54) METHOD FOR PRODUCING HYDROCARBON RESINS AND HYDROGENATION PRODUCTS THEREOF

(71) Applicant: Rain Carbon Germany GmbH, Castrop-Rauxel (DE)

(72) Inventors: Jun Liu, Düsseldorf (DE); Manuel Nau, Haltern am See (DE)

(73) Assignee: Rain Carbon Germany GMBH, Castrop-Rauxel (DE)

( * ) Notice: Subject to any disclaimer, the term of this patent is extended or adjusted under 35 U.S.C. 154(b) by 998 days.

(21) Appl. No.: 16/970,047

(22) PCT Filed: Feb. 14, 2019

(86) PCT No.: PCT/EP2019/053652
§ 371 (c)(1),
(2) Date: Jan. 29, 2021

(87) PCT Pub. No.: WO2019/158638
PCT Pub. Date: Aug. 22, 2019

(65) Prior Publication Data
US 2021/0189038 A1    Jun. 24, 2021

(30) Foreign Application Priority Data
Feb. 14, 2018    (EP) .................... 18156758

(51) Int. Cl.
*C08F 232/06* (2006.01)
*C08F 212/08* (2006.01)
*C09J 125/08* (2006.01)
*C09J 145/00* (2006.01)
*C08F 8/04* (2006.01)

(52) U.S. Cl.
CPC .......... *C08F 232/06* (2013.01); *C08F 212/08* (2013.01); *C09J 125/08* (2013.01); *C09J 145/00* (2013.01); *C08F 8/04* (2013.01); *C08F 2500/02* (2013.01); *C08F 2500/22* (2013.01)

(58) Field of Classification Search
CPC .... C08F 232/06; C08F 212/08; C08F 212/06; C08F 212/04; C08F 8/04; C08F 2500/02; C08F 2500/22
See application file for complete search history.

(56) References Cited

U.S. PATENT DOCUMENTS

| | | | |
|---|---|---|---|
| 3,753,963 A | 8/1973 | Hayashi et al. | |
| 5,171,793 A | 12/1992 | Johnson et al. | |
| 5,502,140 A | 3/1996 | Daughenbaugh et al. | |
| 5,739,239 A | 4/1998 | Daughenbaugh et al. | |
| 6,825,291 B2 * | 11/2004 | Klosiewicz | C08F 8/04 526/87 |
| 9,994,650 B2 * | 6/2018 | Iijima | C07C 2/42 |
| 2018/0186904 A1 | 7/2018 | Lee et al. | |

FOREIGN PATENT DOCUMENTS

| | | |
|---|---|---|
| EP | 2251364 | 11/2010 |
| EP | 3124503 | 2/2017 |
| JP | 2004515618 A | 5/2004 |
| KR | 100354307 B1 | 12/2002 |
| KR | 1020160138391 A | 12/2016 |
| SU | 459891 | 2/1975 |
| WO | 1998030519 | 7/1998 |

OTHER PUBLICATIONS

Search Report for RU 2020129948/04(054028) mailed Feb. 14, 2019.
International Preliminary Report on Patentability from PCT/EP2019/053652 mailed Aug. 18, 2020.
International Search Report from PCT/EP2019/053652 mailed May 13, 2019.
Korean Decision of Grant, Application No. 10-2020-7025532, dated Apr. 28, 2023.

* cited by examiner

*Primary Examiner* — Rip A Lee
(74) *Attorney, Agent, or Firm* — Honigman LLP; Andrew Weber; Jonathan P. O'Brien

(57) ABSTRACT

In a method for the manufacture of a hydrocarbon resin made of at least one cyclic diolefin component and at least one ethylenically unsaturated aromatic component having 8 to 13 carbon atoms, the monomer mixture is heated to a polymerisation temperature of at least 180° C. at a heating speed of 0.5 to 10° C./second to obtain a hydrocarbon resin with a reduced amount of by-products, wherein the monomer mixture is essentially liquid in a single phase during the heating to at least 180° C. and during polymerisation, and the subsequently hydrogenated hydrocarbon resin has good compatibility with other components of hot-melt adhesives.

17 Claims, 1 Drawing Sheet

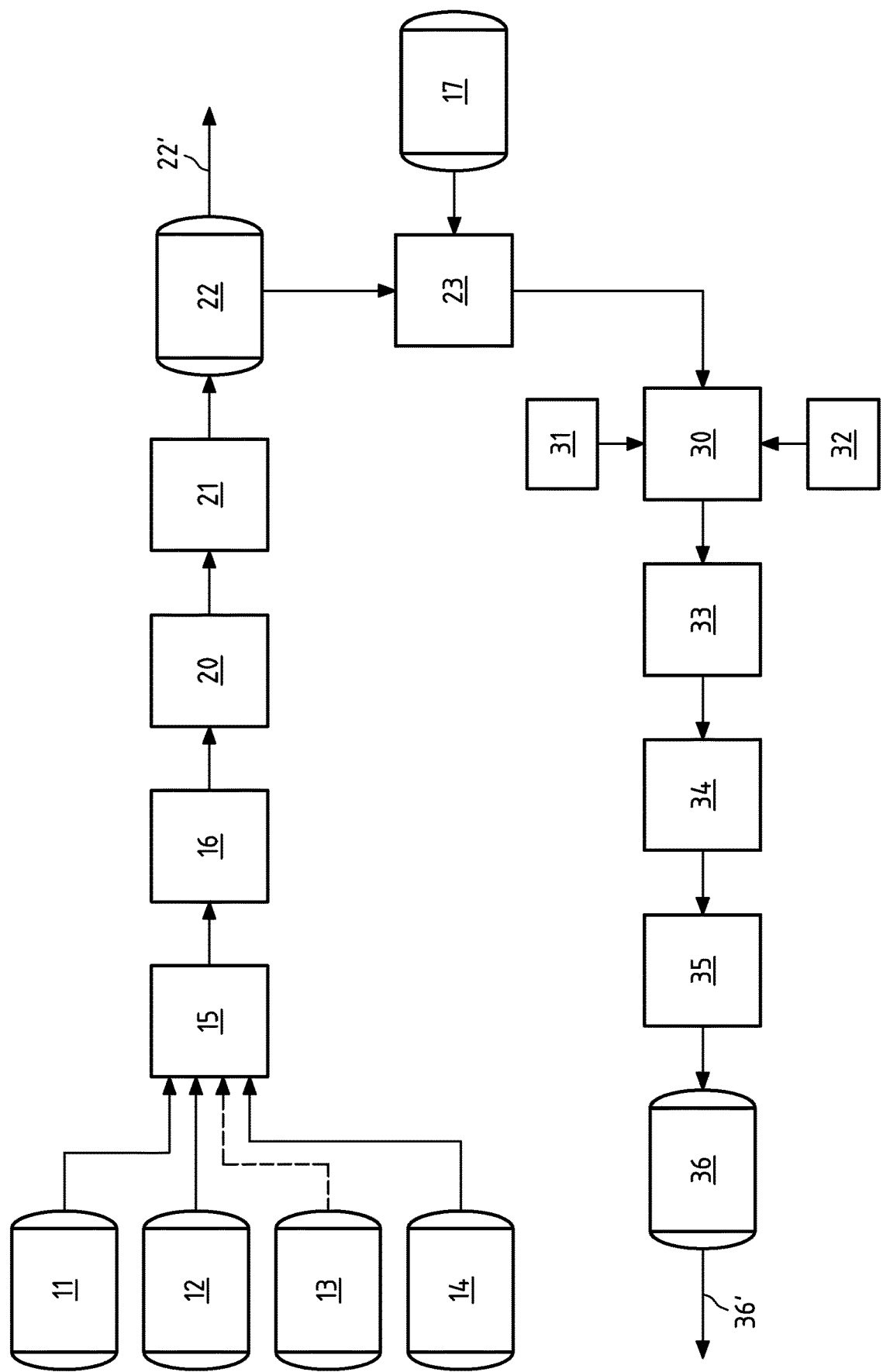

METHOD FOR PRODUCING HYDROCARBON RESINS AND HYDROGENATION PRODUCTS THEREOF

TECHNICAL FIELD OF THE INVENTION

The invention relates to a method for the manufacture of a hydrocarbon resin made of at least one cyclic diolefin component and at least one ethylenically unsaturated aromatic component, the hydrogenation of these and the hydrogenation products.

TECHNICAL BACKGROUND OF THE INVENTION

Hydrocarbon resins are often used as tackifiers in hot-melt adhesives. Hot-melt adhesives which are as bright as possible and have good processing properties are of particular interest. A high tolerance of tackifiers and base polymers is essential for good processing properties of the hot-melt adhesive. In order to manufacture hot-melt adhesives that are as bright and easy to process as possible, it is important for the at least partially hydrogenated hydrocarbon resins used for them to be as free from undesirable by-products as possible. These could lead to dark discolourations of the hydrocarbon resin and incompatibilities with other components of a hot-melt adhesive. The Gardner index, yellowness index or the Hazen colour index are often used to assess discolourations. The tolerance of the components in the hot-melt adhesive is assessed by determining the cloud point.

Methods for manufacturing hydrogenated hydrocarbon resins are known. For example in these processes a cyclic diolefin such as cyclopentadiene and an ethylenically unsaturated aromatic component such as styrene or indene is copolymerised and the hydrocarbon resin obtained is at least partially hydrogenated in a further step. The hydrocarbon resin obtained in this way can be used alone or in combination with other additives as a tackifier for hot-melt adhesives.

A method of this type is described in U.S. Pat. No. 5,502,140 A, wherein particularly inexpensive starting materials containing dicyclopentadiene are used. EP 2 251 364 B1 describes a method for manufacturing hydrocarbon resins of the type described at the outset which have an aromatic compounds content of 5% to 25% by weight.

By-products may arise at various points and for various reasons when manufacturing hydrocarbon resins. For example, in addition to the desired hydrocarbon resin, low molecular weight wax-like or high molecular weight duromer-like by-products can form during polymerisation which have a negative impact on the quality of the end product and can contribute to an incompatibility in the hot-melt adhesive.

By-products with a negative impact can also form during the purification and/or the isolation of the intermediate products or during the isolation of the end product. Polymerisation and hydrogenation are therefore normally carried out in the presence of inert solvents so that in some cases considerable quantities of solvent need to be removed after both polymerisation and hydrogenation. The removal of the often high-boiling solvents mostly requires heating to high temperatures, with the possibility of by-products occurring as a result of secondary reactions.

Various solutions have been proposed to avoid by-products. EP 3 124 503 A1 describes a method for manufacturing hydrocarbon resins in which, in order to improve compatibility with a reasonable increase in cost, dicyclopentadiene is converted with a vinyl aromatic compound into a phenyl norbornene derivative in a preliminary reaction that is then used as a starter in the subsequent polymerisation reaction. The hydrocarbon resin obtained in this way is subsequently hydrogenated. The disadvantage of this method is that the preliminary reaction is an additional step in which the temperature also needs to be kept in a narrow range to obtain a phenyl norbornene derivative with high selectivity.

SUMMARY OF THE INVENTION

The object of the invention is therefore to provide a cost effective method by means of which hydrocarbon resins can be manufactured in a manner which produces as few by-products as possible.

This object is achieved by a method for the manufacture of a hydrocarbon resin made of at least one cyclic diolefin component and at least one ethylenically unsaturated aromatic component, wherein a monomer mixture comprising at least one cyclic diolefin component and at least one ethylenically unsaturated aromatic component having 8 to 13 carbon atoms is heated to a temperature of at least 180° C. at a heating speed of 0.5° C./second to 10° C./second to obtain a hydrocarbon resin made of at least one cyclic dioelfin component and at least one ethylenically unsaturated aromatic component, wherein the monomer mixture is essentially liquid in a single phase during the heating to at least 180° C. and during the polymerisation.

The subject matter of the invention is further a hydrocarbon resin comprising an at least partially hydrogenated hydrocarbon resin made from a cyclic diolefin component and an ethylenically unsaturated aromatic component having 8 to 13 carbon atoms, in particular 8 to 10 carbon atoms, wherein the hydrocarbon resin has a molecular weight $M_z$ of less than 2,500 g/mol, in particular of less than 2,000 g/mol or less than 1,800 g/mol.

The subject matter of the invention is finally the use of the hydrocarbon resin according to the invention in varnish, in particular as an additive in varnish, in plastic, in particular as a modifier in plastic, in rubber products, in particular to improve the mechanical and dynamic properties in rubber products, in bitumen, in particular as an additive and/or hydrophobic agent in bitumen, in polypropylene films, in particular BOPP films, in cosmetics, in printing inks or as a tackifier in adhesive compounds, in particular for application in the sanitary article industry and for use in food packaging.

The temperature control according to the invention in the essentially single phase, liquid monomer mixture significantly reduces the formation of wax-like low molecular weight but also duromer-like high molecular weight by-products. A bright hydrocarbon resin is obtained.

FIG. 1 is a schematic view of the method according to the invention.

PREFERRED EMBODIMENTS OF THE INVENTION

Cyclic diolefins are used as a raw material in the method according to the invention. Cyclic diolefins are in particular cycloalkenes having at least two carbon-carbon double bonds, which can in particular be conjugated. Cyclic diolefins can be present as monomers, as dimers or as a mixture of monomers and dimers. If mixtures of various cyclic diolefins are used, mixed dimers can also be present. Cyclic diolefins used according to the invention can, as monomers, have 5 to 10, in particular 5 to 7, carbon atoms and/or two conjugated carbon-carbon double bonds.

Examples of cyclic diolefins which are suitable according to the invention are cyclopentadiene, cyclopentadiene derivatives such as methylcyclopentadiene, ethylcyclopentadiene, pentamethylcyclopentadiene, ethyltetramethylcyclopentadiene and dicyclopentadiene. Cyclopentadiene and cyclopentadiene derivatives tend to undergo spontaneous dimerisation at room temperature, whereby the monomers form again in the reverse reaction on heating. The two monomers cyclopentadiene-cyclopentadiene-dimer, methylcyclopentadiene-methylcyclopentadiene-dimer and cyclopentadiene-methylcyclopentadiene-co-dimer can be present in mixtures of cyclopentadiene and methylcyclopentadiene.

In addition to purely cyclic diolefins, mixtures containing cyclic diolefins can be used as cyclic diolefin components. A petroleum fraction with a pure cyclic diolefin content of at least 25% by weight based on the mass of the petroleum fraction used can be used as a cyclic diolefin component in the method according to the invention. A pure compound in the sense of the invention has a degree of purity of at least 95%, preferably at least 97%, more preferably at least 99% or 100%, in each case based on the mass of the compound.

The cyclic diolefin component can preferably be cyclopentadiene and/or dicyclopentadiene. The cyclic diolefin component can further preferably be methylcyclopentadiene and/or the dimer of methylcyclopentadiene.

According to one embodiment, the cyclic diolefin component contains cyclopentadiene, dicyclopentadiene, methylcyclopentadiene, and the codimer of methylcyclopentadiene and cyclopentadiene.

The monomer mixture further consists of at least one ethylenically unsaturated aromatic compound having 8 to 13 carbon atoms. This can be a pure compound. According to a further preferred embodiment, a petroleum fraction or a component from the tar preparation with an ethylenically unsaturated aromatic compound content of at least 25% by weight based on the mass of the petroleum fraction or the mass of the fraction from tar preparation can be used.

The ethylenically unsaturated aromatic compound advantageously contains further aromatic compounds with a carbon-carbon double bond outside of the aromatic ring and in particular 8 to 13 carbon atoms. Aromatic compounds of this type are for example styrene, α-methylstyrene, o-vinyl toluene, m-vinyl toluene, p-vinyl toluene, indene, one or more methylindenes.

According to one embodiment, the ethylenically unsaturated component contains styrene, α-methylstyrol, o-vinyl toluene, m-vinyl toluene, p-vinyl toluene, indene and one or more methylindenes.

The cyclic diolefin component and the ethylenically unsaturated aromatic component can be present in the monomer mixture in different ratios. Advantageously, the two components are dosed such that the monomer mixture contains 20% to 95% by weight, preferably 20% to 80% by weight or 40% to 60% by weight cyclic diolefin or cyclic diolefins and 80% by weight to 5% by weight, preferably 80% to 20% by weight or 60% to 40% by weight ethylenically unsaturated aromatic compound or ethylenically unsaturated aromatic compounds, in each case based on the total mass of the monomers in the monomer mixture. According to one embodiment, the cyclic diolefin components and the ethylenically unsaturated aromatic components are dosed such that the monomer mixture contains 50% to 95% by weight, preferably 60% to 95% by weight, more preferably 65% to 90% by weight, particularly preferably 70% to 80% by weight cyclic diolefin or cyclic diolefins and 50% to 5% by weight, preferably 40% to 5% by weight, more preferably 35% to 10% by weight, particularly preferably 20% to 30% by weight ethylenically unsaturated aromatic compound or ethylenically unsaturated aromatic compounds, in each case based on the total mass of the monomers in the monomer mixture.

The monomer mixture can contain a non-polymerisable solvent. Suitable solvents are aromatic and naphthenic solvents. Suitable solvents are therefore, for example, benzene, toluene, xylene, ethylbenzene, cyclohexane, dimethylcyclohexane, ethylcyclohexane or mixtures thereof. Particularly preferably, single or multiple alkyl-substituted benzene compounds with 7 to 10 carbon atoms can be used. These preferably have a boiling point of over 100° C., in particular over 130° C. If xylene is used as a solvent, this can be as a pure compound or as a mixture or two or more of the isomers o-xylene, m-xylene and p-xylene. According to a further preferred embodiment, a C8 isomer mixture can be used. The C8 isomer mixture preferably comprises a mixture of o-xylene, m-xylene, p-xylene and ethylbenzene. Petroleum fractions and components from tar distillation may already contain non-polymerisable solvents. The addition of a solvent is therefore not necessary if a petroleum fraction is used as a cyclic diolefin component and/or a petroleum fraction or a component from tar distillation is used as an ethylenically unsaturated aromatic component.

The non-polymerisable solvent can be included in the monomer mixture at a quantity of 0% to 40% by weight based on the mass of the monomer mixture. A quantity of solvent from 5% to 35% by weight, particularly preferably 5% to 30% by weight, for example around 30% is preferably used, in each case based on the mass of the monomer mixture.

According to one embodiment, the method is essentially carried out under exclusion of oxygen. This can reduce the formation of by-products. In particular, the formation of acidic and ester groups in the product can be avoided. This helps to achieve hydrocarbon resins which are as colourless as possible. The cyclic diolefin component and/or the ethylenically unsaturated aromatic component, in particular the storage containers for the cyclic dioelfin components and/or the ethylenically unsaturated aromatic components are preferably rendered inert using a protective gas such as nitrogen. The non-hydrogenated and/or the hydrogenated hydrocarbon resin, in particular the storage containers for the non-hydrogenated and/or the hydrogenated hydrocarbon resin are advantageously rendered inert using a protective gas such as nitrogen.

An essential feature of the method according to the invention is the rapid heating of the monomer mixture to the polymerisation temperature. According to the invention, the heating of the monomer mixture is carried out at a speed of 0.5° C./second to 10° C./second, preferably 1° C./second to 10° C./second, in particular 2° C./second to 10° C./second, more preferably 2° C./second to 7° C./second, particularly preferably 2° C./second to 5° C./second or 2° C./second to 4° C./second. In particular, the above-mentioned heating speeds are to be used when heating the monomer mixture to the temperature at which the polymerisation starts, in particular up to a temperature of 180° C. to 235° C. As soon as the monomer mixture has reached a temperature of above 180° C. or more, subsequent temperatures can also be set at heating speeds other than those mentioned above. It has been determined that the quantity of by-products is low at the heating speeds according to the invention. This means that the hydrocarbon resins obtained according to the invention have a high compatibility with other components in application formulations of hot-melt adhesives.

Although polymerisation starts at a temperature of 180° C., in the method according to the invention polymerisation can also be carried out at higher temperatures. In the method according to the invention, polymerisation is carried out at a temperature of 180° C. or higher. Polymerisation can be carried out at a temperature of 200° C. to 300° C. or from 250° C. to 300° C. or from 260° C. to 280° C. A polymerisation temperature from 265° C. to 275° C. is more preferable. The temperature can be changed during polymerisation. The temperature can for example be increased up to a final temperature during polymerisation. According to one embodiment, the above-mentioned temperatures are final temperatures. These are achieved at the end of the polymerisation process.

It has been found that high molecular products with low solubility are obtained if the monomer mixture is heated quickly to temperatures, in particular to temperatures above 240° C., in particular at the start of polymerisation. Products with low solubility of this type are problematic in particular for continuous operation. It has further been found that the products have a low softening point and are wax-like if polymerisation is carried out entirely at low temperatures, in particular at temperatures below 240° C. The temperature is therefore expediently changed during the polymerisation reaction.

According to one embodiment, the monomer mixture is therefore firstly heated to a temperature below the temperature at which the polymerisation reaction starts, in particular to a temperature of around 140° C. to 165° C. The monomer mixture is then heated to a final temperature of 250° C. to 280° C., in particular from 255° C. to 270° C. The subsequent heating to a final temperature of 250° C. to 280° C., in particular of 255° C. to 270° C., is expediently carried out according to a temperature profile. The temperature profile preferably consists of a ramp, one or more stages or combinations thereof. The temperature is preferably heated in a linear manner from 180° C. to a final temperature of 280° C. at the start of the polymerisation reaction. A linear ramp from 190° C. to 270° C. is more preferable. A linear ramp from 200° C. to 250° C. is particularly preferable. Since this can be technically difficult to achieve, the linear temperature ramp can also be approached in temperature stages in which the respective temperature is maintained for a certain amount of time before the next temperature stage is set. A combination of stages and ramps is also preferable. It has for example proven to be beneficial to maintain a low temperature, ideally from 180° C. to 230° C., preferably from 200° C. to 220° C., for a longer period of time, in particular for a period of 10 to 45 minutes, preferably from 15 to 35 minutes, and then to increase the temperature to the preferred final temperature of 280° C. or 270° C. or 250° C. in a linear manner. The linear increase in the temperature is preferably carried out at a rate of 50° C./hour to 250° C./hour. The temperature profile more preferably comprises a first step in which the monomer mixture is heated to a first temperature of 180° C. to 230° C., preferably 200° C. to 220° C. The temperature profile advantageously comprises a further step in which the temperature of the monomer mixture is increased from the first temperature to a final temperature of 250° C. to 280° C., preferably 255° C. to 270° C. The heating from the first temperature to the final temperature can be carried out in a gradual or continuous, in particular linear, manner. The heating from the first temperature to the final temperature can further be carried out in an even or uneven manner. The heating from the first temperature to the final temperature can in particular be carried out gradually in an even manner. According to one embodiment, in a first step the monomer mixture is heated to a first temperature of 180° C. to 230° C., in particular from 200° C. to 220° C., and in a further step gradually to a final temperature of 250° C. to 280° C., in particular from 255° C. to 270° C. The monomer mixture is preferably maintained at the final temperature for 20 minutes or less.

The molecular weight Mz of the hydrocarbon resin can be controlled using a temperature profile during polymerisation. A temperature profile can also be used to control the degree of polymerisation and/or the polydispersity. A temperature profile can also be used to control the softening point. A temperature profile can further be used to control the colour and the quantity of by-products produced. In particular, the above-mentioned temperature profiles in which temperatures of above 240° C. are reached towards the end of the polymerisation reaction can avoid large quantities of insoluble, high molecular weight products being generated. At the same time, these temperature profiles can be used to obtain hydrocarbon resins with the desired softening points.

The polymerisation can be carried out at a pressure of 10 bar or more. The pressure can for example be 10 bar to 25 bar, in particular 15 bar to 25 bar or from 10 bar to 15 bar. If the polymerisation is carried out at less than 10 bar, the end product will be of lower quality. The yield will also be lower. The presence of a gas phase can further be essentially avoided by the above-mentioned pressures. This enables better control of the reaction.

The polymerisation can be carried out in a continuous or discontinuous manner. The polymerisation is preferably carried out in a continuous manner. The continuous method has the advantage that the heat transfer is better than in the discontinuous method. The operating costs are also lower for continuous implementation, and the method can be carried out more safely.

The polymerisation can be carried out in different reaction containers. The polymerisation is preferably carried out in a tube reactor. This approach has proven advantageous in the case of continuous polymerisation in particular. The polymerisation can in particular be carried out over a dwell time of 30 to 180 minutes, in particular from 40 to 120 minutes or from 50 to 90 minutes in a tube reactor.

If the properties of the hydrocarbon resin obtained according to the invention are to be changed, the hydrocarbon resin that is obtained can be recyclised in full or in part in the tube reactor. This measure is for example sensible if higher molecular weights of the hydrocarbon resin are to be achieved. Recyclising is preferably carried out in the raw material mixture in the input stream. The quantity of recyclised hydrocarbon resin can be 0% to 90% by weight based on the mass of the product flow exiting. Recyclising of this type can be carried out in a particularly simple manner in tube reactors.

The hydrocarbon resin obtained after polymerisation can be further processed directly after separating the solvent and unconverted monomer, or it can be temporarily stored in a temporary storage tank. It is preferably temporarily stored in a temporary storage tank. Any fluctuations in production quantities can be balanced out by the temporary storage tank. The hydrocarbon resin can also be used directly for the applications mentioned here, in particular for rubber applications. The hydrocarbon resin can also be functionalised or hydrogenated. Monomers that have not been converted can be thermally separated from the solvent and recyclised by being added back into the raw material mixture in the input stream. This further increases the yield of resin.

The polymerisation of the raw materials into hydrocarbon resin is preferably carried out without a catalyst.

The hydrocarbon resin obtained according to the invention is preferably partially or fully hydrogenated. Hydrogenation is carried out in the presence of a catalyst. Various catalysts can be considered. Nickel-based, palladium-based, cobalt-based, platinum-based and rhodium-based catalysts can be used in hydrogenation. Nickel is preferably used as the catalyst. The above-mentioned catalysts can be applied to a carrier such as aluminium oxide, silicon dioxide, zeolites, clay minerals such as montmorillonite and silicon carbide. The hydrogenation of the hydrocarbon resin is preferably carried out in the presence of a nickel catalyst. According to a further preferred embodiment of the invention, a nickel catalyst on an aluminium oxide/silicon dioxide carrier is used. These catalysts are commercially available. The nickel catalyst can in particular be in heterogeneous form. This means it can simply be removed by means of filtration after the end of hydrogenation.

The term "partial hydrogenation" is understood to mean that the isolated double bonds are predominantly hydrogenated or that additionally some of the aromatic components of the hydrocarbon resin are hydrogenated. The hydrocarbon resin is preferably fully hydrogenated during hydrogenation. In the case of full hydrogenation, 95% or more, in particular 98% or more or 99% or more or all of the unsaturated components are converted. Full hydrogenation has the advantage that fewer by-products are formed by secondary reactions and therefore discolourations in the hydrocarbon resin are avoided as far as possible. It is possible to determine whether the hydrocarbon resin has been partially or fully hydrogenated by means of NMR spectroscopy, in particular by determining the double bond content using 1H NMR spectroscopy.

Hydrogenation can be carried out in the presence of a solvent, in particular an aliphatic solvent. Suitable solvents are for example refined petroleums, in particular a mixture of saturated hydrocarbons which are liquid at room temperature. Mixtures of this type are commercially available under the designation D40, for example Exxsol D40 or Shellsol D40. The viscosity of the hydrocarbon resin can be decreased by adding the solvent. The use of an aliphatic solvent such as D40 can further save on hydrogen compared to the use of an aromatic solvent.

80% by weight or more, in particular 90% by weight or more or 100% by weight or more of solvent based on the mass of hydrocarbon resin can preferably be added to the hydrocarbon resin. A hydrogenation mixture containing hydrocarbon resin and solvent is preferably used. The hydrogenation mixture is preferably a solution. The hydrogenation mixture has preferably 50% hydrocarbon resin.

The hydrogenation can be carried out in a discontinuous or continuous manner. The reaction is preferably continuous. The hydrogenation can preferably be carried out in a loop reactor. The hydrogenation mixture is preferably circulated. The loop reactor advantageously has a gas-liquid ejector. A loop reactor combined with a gas-liquid ejector can be used to achieve particularly good mixing of the hydrocarbon resin to be hydrogenated with hydrogen and any catalyst that is added, reducing the duration of hydrogenation.

Preferably, the hydrogenation is carried out at a pressure of more than 70 bar, in particular from 75 bar to 105 bar or from 80 bar to 100 bar or from 85 bar to 95 bar. This can be used to adjust the hydrogenation of the hydrocarbon resin to the desired degree of hydrogenation.

The hydrogenation is also preferably carried out at a temperature of 250° C. or higher, in particular from 250° C. to 300° C. or from 260° C. to 280° C. It has been identified that the hydrogenation runs slowly at a hydrogenation temperature of less than 250° C. and that increasing numbers of by-products can once again form at temperatures of over 300° C.

In a standard industrial loop reactor, the hydrogenation can be carried out for 80 to 160 minutes, preferably 90 to 150 minutes, particularly preferably 100 to 150 minutes, or 110 to 150 minutes. The desired degree of hydrogenation and the brightness of the hydrocarbon resin can be adjusted in this way.

According to a particularly preferred embodiment of the invention, a flash evaporation stage is provided both after the polymerisation and after the hydrogenation.

The first flash evaporation stage after polymerisation is to remove volatile components, in particular solvents and/or monomers which have not reacted from the polymerisation mixture containing the hydrocarbon resin. Exploiting the drop in pressure in the first flash evaporation stage means the polymerisation mixture is flashed, resulting in the more volatile components being removed. The polymerisation mixture containing the hydrocarbon resin can preferably be introduced into the first flash evaporation stage at a temperature of 240° C. to 300° C., particularly preferably at a temperature of 250° C. to 290° C. or 260° C. to 280° C.

After the first flash evaporation stage, the hydrocarbon resin preferably only has 3% by weight or less, particularly preferably 1% by weight or 0.5% by weight or less solvent and/or monomers which have not reacted, in each case based on the mass of the hydrocarbon resin.

In the first flash evaporation stage, the absolute pressure can be reduced to 1 bar or less, preferably 0.1 bar or less and particularly preferably to 0.03 bar or less. Reducing the pressure means complex stirring machines such as thin-film evaporators or water stripping devices are not needed. This means the method can be carried out in a more cost effective manner that is less susceptible to failures. A thin-film evaporator can, however, be used in the method after polymerisation and subsequent first flash evaporation stage. This means a low solvent content in the hydrocarbon resin after polymerisation is achieved.

A second flash evaporation stage can preferably be provided after the hydrogenation of the hydrocarbon resin. In the second flash evaporation stage, at least some of the volatile components, in particular the solvent, can be removed from the hydrocarbon resin without additional thermal loads resulting in a large quantity of by-products and worsening the colour index of the resin. After the second flash evaporation stage, the hydrocarbon resin preferably has 2% by weight or less, preferably 0.5% by weight or less or 0.03% by weight or less solvent, in each case based on the mass of the hydrocarbon resin.

The reduction in pressure in the second flash evaporation stage can be carried out in two flash evaporation steps. In a first flash evaporation step, the absolute pressure can be reduced to 0.5 bar or less, preferably 0.2 bar or less, preferably to 0.05 bar or less and particularly preferably 0.01 bar or less. After the hydrogenation, the catalyst is preferably removed first. The catalyst can for example be removed by filtration. The hydrogenation mixture is preferably introduced into the first flash evaporation step at a temperature of 190° C. to 270° C., more preferably of 200° C. to 260° C., more preferably of 210° C. to 250° C., more preferably of 220° C. to 240° C., even more preferably of 230° C. After the first flash evaporation step, the hydrogenation mixture can be introduced into the second flash evaporation step at a temperature of 190° C. to 270° C., preferably of 200° C. to 260° C., particularly preferably of 210° C. to 250° C. or of 220° C. to 240° C. In the second flash evaporation step, the absolute pressure can be reduced to 0.1 bar or less, preferably 0.05 bar or less, more preferably 0.03 bar or less, more preferably 0.01 bar or less.

The first and second flash evaporation stage can be called devolatilisation.

In addition to this, the hydrogenation mixture from which the catalyst that was previously added was removed can also be introduced immediately before the second flash evaporation stage in a pre-flash evaporation stage. The hydrogenation mixture can have a temperature of 240° C. to 300° C., preferably of 250° C. to 290° C. and particularly preferably of 260° C. to 280° C. In the pre-flash evaporation stage, the excess pressure can be reduced to 3 bar or less, preferably 2 bar or less, more preferably 1.5 bar or less, even more preferably 1 bar or less.

If a pre-flash evaporation stage is provided, the mixture removed from the pre-flash evaporation stage is introduced into the second flash evaporation stage.

The implementation of one or more flash evaporation stages can decrease the period of time for which the hydrocarbon resin is kept at the correct temperature. This measure can also reduce the by-products.

According to one embodiment, two flash evaporation steps are provided after the hydrogenation of the hydrocarbon resin. These two flash evaporation steps preferably form the second flash evaporation stage. In order to do this, the catalyst is preferably removed first. The catalyst can for example be removed by filtration. The preferably catalyst-free hydrogenation mixture is then preferably guided into a first pressure container in the first flash evaporation step. The pressure in the first pressure container is lower than the pressure of the hydrogenation mixture. The pressure of the hydrogenation mixture in the first pressure container is reduced to an absolute pressure of 3 bar or less, preferably 2 bar or less, more preferably 1.5 bar or less, even more preferably 1 bar or less. This can remove in particular hydrogen from the hydrogenation mixture.

In the second flash evaporation step, the resulting mixture is guided into a second pressure container. The pressure in the second pressure container is lower than the pressure of the resulting mixture. The pressure of the resulting mixture in the second pressure container is reduced to 0.1 bar or less, preferably 0.05 bar or less, particularly preferably 0.03 bar or less. This can remove solvents in particular. A thin-film evaporator is advantageously provided after the second flash evaporation step, which thin-film evaporator operated at 0.01 bar or less, preferably at 0.005 bar or less, more preferably 0.003 bar or less. The solvent can largely be removed from the hydrogenated hydrocarbon resin in this way.

The hydrogenation mixture is preferably introduced into the first flash evaporation step at a temperature of 190° C. to 270° C., more preferably of 200° C. to 260° C., more preferably of 210° C. to 250° C., more preferably of 220° C. to 240° C., even more preferably of 230° C. After the first flash evaporation step, the hydrogenation mixture can be introduced into the second flash evaporation step at a temperature of 190° C. to 270° C., preferably of 200° C. to 260° C., particularly preferably of 210° C. to 250° C. or of 220° C. to 240° C. After the second flash evaporation step, the hydrogenation mixture can be introduced into the thin-film evaporator at a temperature of 180° C. to 260° C., preferably of 190° C. to 250° C., particularly preferably of 200° C. to 240° C. or of 210° C. to 230° C.

The hydrocarbon resin obtained according to the invention can have a molecular weight $M_z$ of less than 2,500 g/mol, preferably less than 2,000 g/mol, particularly preferably less than 1,800 g/mol.

The hydrocarbon resin obtained according to the invention preferably hydrogenated. The term "hydrogenated" also includes those hydrocarbon resins in which the double bonds are at least 90%, preferably 95% to 100% hydrogenated. If the hydrocarbon resin is fully hydrogenated, preferably at least 95%, more preferably at least 98%, particularly preferably at least 99% of the double bonds in the hydrocarbon resin are hydrogenated. Higher degrees of hydrogenation can improve the thermostability of the hydrocarbon resin. The double bond content can be determined using 1H NMR spectroscopy.

Various molecular weights are known to the person skilled in the art. The number average molecular weight $M_n$, the weight average molecular weight $M_w$ and the centrifuge average molecular weight $M_z$ are known to the person skilled in the art. In this case, the centrifuge average molecular weight $M_z$ is also abbreviated as molecular weight $M_z$.

Methods to determine the molecular weight $M_z$ are known to the person skilled in the art. They can for example determine the molecular weight $M_z$ using gel permeation chromatography or mass spectrometry. THF is preferably used as an eluent for measurements carried out using gel permeation chromatography. Polystyrene is preferably used as a calibration standard. The measurements carried out using gel permeation chromatography are advantageously carried out using linear columns with a porosity of 1000 Å. RI and UV detectors are preferably used. A UV detector can show the degree of hydrogenation of a molar mass section in addition to the molar mass.

The hydrocarbon resin obtained according to the invention preferably has a polydispersity index of 2.5 or less, preferably 2 or less, particularly preferably 1.5 or less.

The softening point of the hydrocarbon resin is preferably 170° C. or less, in particular 60° C. to 150° C. or 70° C. to 140° C. or 80° C. to 130° C. or 90° C. to 140° C. The ring-and-ball method according to the standard ASTM D 3461 is used to determine the softening point.

Furthermore, the hydrocarbon resin obtained according to the invention can have a Hazen colour index of 40 or less, in particular of 25 or less. The Hazen colour index is determined according to the standard DIN EN ISO 6271: 2016-05. The Hazen colour index can also be called the platinum-cobalt colour index.

The hydrocarbon resin obtained according to the invention can have a yellowness index of 4 or less, in particular of 2 or less. The yellowness index is determined according to the standard ASTM D1209-05(2011).

The invention further relates to the use of the hydrocarbon resin according to the invention in varnish, in particular as an additive in varnish, in plastic, in particular as a modifier in plastic, in rubber products, in particular to improve the mechanical and dynamic properties in rubber products, in bitumen, in particular as an additive and/or hydrophobic agent in bitumen, in polypropylene films, in particular BOPP films, in cosmetics, in printing inks or as a tackifier for hot-melt adhesives, in particular for application in the sanitary article industry and for use in food packaging.

The non-hydrogenated hydrocarbon resin is preferably used to improve the mechanical and dynamic properties in rubber products such as tyres, in bitumen, in particular for asphalt, and in printing inks.

The hydrogenated hydrocarbon is preferably used in varnish, in particular as an additive in varnish, in plastic, in particular as a modifier in plastic, in bitumen, in particular as a hydrophobic agent in bitumen, for example for roof sheeting, in polypropylene films, in particular as a modifier and/or hydrophobic agent in polypropylene films, in particular BOPP films, in cosmetics or as a tackifier in adhesive compounds, in particular for applications in the sanitary article industry and for use in food packaging.

EXAMPLE

The invention is described in greater detail below by means of an exemplary, non-limiting manufacture of a hydrocarbon resin according to the invention including hydrogenation. The pressures indicated are absolute pressures.

In the continuous method shown schematically in FIG. 1, a petroleum fraction (hereinafter referred to as BN-200) rich in dicyclopentadiene, methylcyclopentadiene dimers and cyclopentadiene-methylcyclopentadiene dimers (hereinafter referred to as cyclic diolefins) is in supply tank 11. A further petroleum fraction (hereinafter referred to as C9 fraction) rich in styrene, vinyl toluene, indene and methylindene (hereinafter referred to as ethylenically unsaturated aromatic compounds) is in supply tank 12. Supply tank 13 contains dicyclopentadiene with a purity of at least 95%. Supply tank 14 contains xylene as an inert solvent. A monomer mixture is made from the supply tanks 11, 12, 13 and 14 in the storage tank 15. The monomer mixture is mixed using a static mixer on introduction into the storage tank 15. The storage tank 15 can also have a stirrer for mixing. The components BN-200, C9 fraction, pure dicyclopentadiene and xylene are taken from the supply tanks 11, 12, 13 and 14 in such quantities that the monomer mixture contains cyclic diolefins and ethylenically saturated aromatic compounds in a ratio of 3:1 based on the mass of the cyclic diolefins and ethylenically unsaturated aromatic compounds in the monomer mixture. The ratio can in particular be adjusted by the addition of pure dicyclopentadiene from supply tank 13. The monomer mixture also contains 50% solvent based on the mass of the monomer mixture.

The mixture is inserted from the storage tank 15 into the heater 16 at a feed flow of 12 kg/h. The monomer mixture is then brought to a reaction temperature of 192° C. in the heater and then polymerised in the tube reactor 20. The temperature of the monomer mixture is increased to 192° C. at a heating speed of 1° C./second, resulting in hydrocarbon resin that has not yet been hydrogenated. The tube reactor 20 consists of five tube segments. The temperature of the monomer mixture is gradually increased in each of the tube segments. In the first tube segment, the temperature of the monomer mixture is increased to 219° C. This causes the monomer mixture to react, generating the hydrocarbon resin that has not yet been hydrogenated. In the second tube segment, the temperature of the monomer mixture is increased to 231° C. The temperature is gradually increased in each of the tube segments of the tube reactor 20. In the third tube segment, the temperature of the monomer mixture is increased to 243° C. In the fourth tube segment, the temperature of the monomer mixture is increased to 252° C. In the fifth tube segment, the temperature of the monomer mixture is increased to 263° C. The pressure in the tube reactor 20 is 15 bar. The dwell time in the tube reactor 20 is 60 minutes. The monomer mixture is essentially liquid in a single phase during the heating and the polymerisation.

A flow of 12 kg/h non-hydrogenated hydrocarbon resin, residual solvent and residual monomers is obtained from the tube reactor 20 and introduced into the flash evaporator 21. The flow enters the flash evaporator 21 at a temperature of 263° C. and a pressure of 15 bar. The pressure of the flow is reduced to 30 mbar in the flash evaporator 21. This reduces the solvent and non-reacted monomer content in the hydrocarbon resin to 10,000 ppm or less. The bottom product from the flash evaporator 21, which essentially consists of hydrocarbon resin which has not yet been hydrogenated, is added to the temporary storage tank 22 as a temporary product flow of 3.7 kg/h. Overhead, a condensate flow of 8.3 kg/h containing solvent and non-reacted monomers is discharged from the flash evaporator 21. In order to further purify the hydrocarbon resin, a thin-film evaporator can be used after the flash evaporator 21. The hydrocarbon resin in the temporary storage tank 22 has a centrifuge average molecular weight of less than 1800 g/mol. Furthermore, the hydrocarbon resin in the temporary storage tank 22 has a softening point of 95° C. determined using the ring-and-ball method according to the standard ASTM D 3461. The Hazen colour index of the hydrocarbon resin in the temporary storage tank 22 determined according to DIN EN ISO 6271:2016-05 is 13. The hydrocarbon resin that has not yet been hydrogenated can be removed from the temporary storage tank 22 via the extraction point 22'.

In order to manufacture a hydrogenated hydrocarbon resin, the hydrocarbon resin is removed from the temporary storage tank 22 and introduced into the storage tank 23 together with an aliphatic solvent, for example Exxsol D40, from supply tank 17. A static mixer is used to mix the hydrocarbon resin with the aliphatic solvent. The hydrocarbon resin is dissolved in the aliphatic solvent at a concentration of 50% by weight in the storage tank 23. Of the solution in the storage tank 23, 7.4 kg/h is introduced into the loop reactor 30 for hydrogenation. The loop reactor 30 is supplied with a nickel catalyst on silica from the catalyst stock 31. The catalyst is periodically replaced. The quantity of catalyst in the loop reactor 30 is 1.5% by weight based on the mass of hydrocarbon resin that has yet to be hydrogenated. The loop reactor 30 is supplied with hydrogen from the hydrogen generation 32. The pressure in the loop reactor 30 is set at 90 bar. In the loop reactor, the hydrogenation mixture is converted circulated at a ratio of 100:1 based on the flow into the loop reactor 30. The hydrogenation is carried out in the loop reactor 30 at a temperature of 270° C. The dwell time for the hydrogenation mixture in the loop reactor 30 is 120 minutes.

The catalyst is removed from the loop reactor using the reactor filter 33 and a product flow of 7.5 kg/h is introduced into the first pressure container 34. The product flow is introduced into the first pressure container 34 at a pressure of 85 bar. The temperature of the product flow is 270° C. In the first pressure container 34, the pressure is flashed to 1.2 bar. As bottom product, 4.2 kg/h is introduced from the first pressure container 34 into the combined container 35. Overhead, 3.3 kg/h aliphatic solvent and hydrogen are discharged.

The bottom product from the first pressure container 34 is introduced into the combined container 35 with a second pressure container with attached thin-film evaporator via an expansion valve at a temperature of 240° C. The pressure in the second pressure container is reduced to 0.03 bar. A total of 3.84 kg/h resin is obtained as a bottom product and 0.36 kg/h aliphatic solvent is obtained as an overhead product. The bottom product is then flashed at 230° C. in the downstream thin-film evaporator, which is operated at 0.003 bar. Overhead, 0.04 kg/h aliphatic solvent is removed. A total of 3.80 kg/h hydrogenated hydrocarbon resin with a residual solvent content of less than 300 ppm is obtained as a bottom product and added into the product storage tank 36. This can then be removed via the extraction point 36'.

The steps of polymerisation, hydrogenation and material separation described in the previous example can also be carried out separately from one another, for example in a discontinuous operation.

The method shown in the above example can also be carried out essentially under exclusion of oxygen.

The hydrogenated hydrocarbon resin in the product storage tank 36 has a number average molecular weight of less than 1800 g/mol. The yellowness index of the hydrogenated hydrocarbon resin measured according to ASTM D1209-05 (2011) is less than 1. Furthermore, the hydrogenated hydrocarbon resin has a softening point of 100° C. determined using the ring-and-ball method according to the standard ASTM D 3461. In the hydrogenated hydrocarbon resin, more than 98% of the double bonds in the non-hydrogenated hydrocarbon resin are hydrogenated. The hydrogenated hydrocarbon resin has a VOC content of less than 300 ppm.

REFERENCE NUMERALS 11 supply tank BN-200
12 supply tank C9 fraction
13 supply tank pure dicyclopentadiene
14 supply tank xylene
15 storage tank
16 heater
17 supply tank D40
20 tube reactor
21 flash evaporator
22 temporary storage tank
22 extraction point
23 storage tank
30 loop reactor
31 catalyst stock
32 hydrogen generation
33 reactor filter
34 first pressure container
35 combined container on second pressure container with downstream thin-film evaporator
36 product storage tank
36 extraction point

The invention claimed is:

1. A method for manufacturing a hydrocarbon resin comprising at least one cyclic diolefin monomer component and at least one ethylenically unsaturated aromatic monomer component comprising
   (a) heating to a temperature of at least 180° C. at a heating rate of 0.5 to 10° C./second a mixture comprising at least one cyclic diolefin monomer component and at least one ethylenically unsaturated aromatic monomer component having 8-13 carbon atoms, and
   (b) polymerizing the mixture to form a hydrocarbon resin having a molecular weight of less than 2,500 g/mol, the molecular weight characterized as the centrifuge average (z-average) molecular weight,
   wherein the mixture comprises a single phase liquid during heating and polymerization.

2. The method of claim 1, wherein the at least one cyclic diolefin monomer component comprises cyclopentadiene, methylcyclopentadiene, ethylcyclopentadiene, or pentamethylcyclopentadiene, or any combination thereof.

3. The method of claim 2, wherein the at least one ethylenically unsaturated aromatic monomer component comprises styrene, α-methylstyrene, o-vinyltoluene, m-vinyltoluene, p-vinyltoluene, indene, methylindene, or any combination thereof.

4. The method of claim 3, wherein the mixture comprises the at least one cyclic diolefin monomer component and the at least one ethylenically unsaturated aromatic monomer component in a ratio of 3:1.

5. The method of claim 3, wherein the mixture further comprises a monomer solvent comprising o-xylene, m-xylene, p-xylene, or ethylbenzene.

6. The method of claim 5, wherein concentration of monomer solvent in the mixture is from 5% to 35% by weight of the mixture.

7. The method of claim 5, wherein the heating of step (a) is a step-wise heating that comprises
   (a1) a first heating step comprising heating the mixture to a first temperature of 180° C. to 230° C. at a first heating rate of 0.5 to 10° C./second and holding the mixture at the first temperature for a period of 10-45 minutes; and
   (a2) a second heating step comprising heating the mixture to a second temperature of 250° C. to 280° C. at a second heating rate of 50° C./hour to 250° C./hour.

8. The method of claim 7, wherein the first heating rate of the first heating step (a1) is 1° C./second to 10° C./second, 2° C./second to 10° C./second, 2° C./second to 7° C./second, 2° C./second to 5° C./second, or 2° C./second to 4° C./second.

9. The method of claim 7, wherein the polymerizing step (b) is conducted continuously in a tube reactor with a dwell time of 30 to 180 minutes.

10. The method of claim 7, wherein the polymerizing polymerization step (b) is conducted at a pressure of 10 bar to 25 bar.

11. The method of claim 10, wherein the first heating step, the second heating step and/or polymerizing step (b) is conducted under nitrogen gas and/or in the absence of oxygen.

12. The method of claim 10, further comprising
   (c) at least partially hydrogenating the hydrocarbon resin.

13. The method of claim 12, wherein the at least partially hydrogenating of step (c) is conducted in the presence of a hydrogenation solvent comprising one or more saturated hydrocarbons, wherein the hydrogenation solvent is liquid at room temperature.

14. The method of claim 13, wherein the at least partially hydrogenating of step (c) is conducted in the presence of catalyst, wherein the catalyst comprises nickel, palladium, cobalt, platinum, or rhodium.

15. The method of claim 14, wherein the at least partially hydrogenating of step (c) is conducted at a pressure of greater than 70 bar.

16. The method of claim 12, further comprising
   (d) removing a portion of the monomer solvent in a first evaporation step that is conducted following the polymerizing of step (b) and prior to the at least partially hydrogenating of step (c).

17. The method of claim 13, further comprising
   (d) removing a portion of the hydrogenation solvent and/or a portion of the monomer solvent in a second evaporation step that is conducted following the at least partially hydrogenating of step (c).

* * * * *